United States Patent [19]

Smolarek et al.

[11] Patent Number: 5,656,068
[45] Date of Patent: Aug. 12, 1997

[54] LARGE CAPACITY VACUUM PRESSURE SWING ADSORPTION PROCESS AND SYSTEM

[75] Inventors: James Smolarek, Boston; Herbert Raymond Schaub, East Amherst, both of N.Y.

[73] Assignee: Praxair Technology, Inc., Danbury, Conn.

[21] Appl. No.: 608,927

[22] Filed: Feb. 29, 1996

[51] Int. Cl.⁶ ................................. B01D 53/053
[52] U.S. Cl. ................ 95/101; 95/102; 95/105; 95/130; 96/130; 96/133; 96/144
[58] Field of Search .............. 95/101–105, 130; 96/108, 128, 130, 133, 144

[56] References Cited

U.S. PATENT DOCUMENTS

| | | | |
|---|---|---|---|
| 2,640,558 | 6/1953 | Dauphinee | 96/133 |
| 2,699,287 | 1/1955 | Daninhirsch | 96/133 |
| 2,944,627 | 7/1960 | Skarstrom | 95/130 X |
| 3,204,388 | 9/1965 | Asker | 96/130 X |
| 3,280,536 | 10/1966 | Berlin | 95/105 |
| 3,313,091 | 4/1967 | Berlin | 95/105 |
| 3,430,418 | 3/1969 | Wagner | 55/25 |
| 3,498,025 | 3/1970 | Bednarski | 95/102 |
| 3,636,679 | 1/1972 | Batta | 55/26 |
| 3,720,042 | 3/1973 | Simonet | 95/130 X |
| 4,340,398 | 7/1982 | Doshi et al. | 55/25 |
| 4,543,109 | 9/1985 | Hamlin et al. | 95/130 X |
| 4,552,571 | 11/1985 | Dechene | 95/130 X |
| 4,781,735 | 11/1988 | Tagawa et al. | 95/101 |
| 4,810,265 | 3/1989 | Lagree et al. | 95/101 |
| 5,042,994 | 8/1991 | Smolarek | 95/101 X |
| 5,084,075 | 1/1992 | Sircar | 95/103 X |
| 5,250,088 | 10/1993 | Yamaguchi et al. | 95/98 |
| 5,261,947 | 11/1993 | Hay et al. | 95/101 |
| 5,330,561 | 7/1994 | Kumar et al. | 95/105 X |
| 5,393,326 | 2/1995 | Engler et al. | 95/103 |
| 5,411,578 | 5/1995 | Watson et al. | 95/101 |
| 5,536,299 | 7/1996 | Girard et al. | 95/101 |
| 5,540,758 | 7/1996 | Agrawal et al. | 95/101 |
| 5,549,733 | 8/1996 | Marot et al. | 95/130 X |

OTHER PUBLICATIONS

J. Izumi et al., "High Efficiency Oxygen Separation with the Low Temperature and Low Pressure PSA", Nov., 1989.

*Primary Examiner*—Robert Spitzer
*Attorney, Agent, or Firm*—Robert J. Follett

[57] ABSTRACT

Large vacuum pressure swing adsorption-oxygen plants are employed with four adsorption vessels, two air compressors, two vacuum pumps and an oxygen surge tank, operated on a (two) two-bed processing system basis. One two-bed system is offset from the other by one half of one half processing cycle. Reduced power and capital cost savings are achieved.

19 Claims, 4 Drawing Sheets

LARGE CAPACITY VACUUM PRESSURE SWING ADSORPTION PROCESS AND SYSTEM

BACKGROUND OF THE INVENTION

1. Field of the Invention

The invention relates to a vacuum pressure swing adsorption process and system for the production of oxygen. More particularly, it relates to a process and system adapted for the large scale production of oxygen from air.

2. Description of the Prior Art

In numerous chemical processing, refinery, metal production and other industrial applications, purified gas streams are employed for a variety of processing purposes. For example, high purity oxygen is used in chemical processing, steel mills, paper mills, and in lead and gas production operations. Oxygen and nitrogen are produced from air, typically by cryogenic distillation for large size applications. While such cryogenic processing can be very efficient, particularly when conducted in large size plants, it nevertheless requires complex and costly equipment.

Pressure swing adsorption (PSA) processes have also been used to separate and purify gases, but the production of oxygen by the PSA approach has generally been confined to relatively small-sized operations with respect to which the use of cryogenic air separation may not be economically feasible. Many commonly available adsorbents, particularly the class of materials known as molecular sieves, selectively adsorb nitrogen more strongly than oxygen, and this preferential adsorption is the basis of a variety of PSA processes that have been developed for the separation of air to produce oxygen and nitrogen product gas.

PSA processes for air separation to produce product oxygen are known in the art, as indicated by the Skarstrom patent, U.S. Pat. No. 2,944,627. Such processes typically comprise four separate operating steps carried out, in turn, in each bed of multi-bed PSA systems. Such steps are (1) adsorption, in which feed air is passed at an upper adsorption pressure to the feed end of the bed, containing adsorbent material capable of selectively adsorbing nitrogen as the more readily adsorbable component of air, with the less readily adsorbable oxygen being recovered from the product end of the bed; (2) countercurrent depressurization at a lower desorption pressure; (3) desorption of the more readily adsorbable nitrogen from the adsorbent bed, and its withdrawal from the feed end of the bed with or without the introduction of purge gas to the product end of the bed; and (4) repressurization of the bed to the upper adsorption pressure. This processing sequence, or variations thereof, is then repeated in each bed of the system with additional quantities of feed air, as continuous oxygen-producing operations are carried out in the PSA system.

When the PSA process is employed principally to remove strongly adsorbable impurities present in low concentration in a gas stream, i.e. $CO_2$ and/or $H_2O$ in air, the constant pressure steps of adsorption (1) and desorption (3) occupy most of the processing cycle time, and the pressure change steps, i.e. countercurrent depressurization (2) and repressurization (4) are transients. In the production of oxygen from air, where the more readily adsorbable nitrogen comprises 79% of the feed stream, the pressure change steps are of greater significance to the overall processing efficiency. Many different modifications of the basic PSA processing sequence have been developed, including many variations in the pressure swing steps.

Most PSA processes for producing oxygen from air are carried out in multi-bed system, i.e. systems incorporating two or more adsorbent beds, with each bed undergoing the same sequence of steps, but in a different phase relationship with the other beds in the system. The processing steps are synchronized and are usually carried out for a fixed period of time. Operating in this manner, the supply of oxygen product can be made more steady, and the utilization of mechanical pumps made more nearly constant than otherwise would be the case. Many PSA processes also employ one or more pressure equalization steps, wherein gas withdrawn from one bed at high pressure is passed to another bed initially at low pressure until the pressures in said beds are equalized. This procedure has the advantages of saving some compression energy, supplying the equivalent of purge gas if the equalization is accomplished through the product ends of the beds, and elevating the overall recovery of desired oxygen product.

A particular PSA process for producing oxygen from air utilizes a three bed system and incorporates the following processing steps: (1) adsorption with feed air introduction, bed pressurization and simultaneous oxygen product recovery; (2) co-current depressurization for further product recovery; (3) pressure equalization; (4) countercurrent depressurization; (5) purge and (6) repressurization. This process operates with a typical upper adsorption pressure of 50 psia, and a lower desorption pressure of one atmosphere. While this processing system and process can effectively recover oxygen from air, it is not sufficiently efficient for use in large volume commercial operations. The operating costs for such systems are high because of the relatively high compression ratio required. For a given product flow rate, the adsorbent inventory required for such systems is also relatively high.

PSA processes have also been developed that operate between atmospheric adsorption pressure and a relatively deep vacuum desorption pressure. Since the adsorptive storage of nitrogen is pressure dependent, such processes and systems, i.e. vacuum pressure swing adsorption (VPSA) processes and systems, require a large adsorbent inventory, which greatly increases the capital costs associated therewith.

It has also been found that this process can be improved by employing a partial pressure-equalization step instead of the essentially full pressure equalization conventional in the PSA art in which the adsorbent selectively adsorbs nitrogen from air. Various other modifications of the basic PSA process have been proposed in the art, with most being related to variations in the pressurization and depressurization steps. Suh and Hankat, in AICHE J 1989 35 523, have, for example, reported on the merits of using combined co-current-countercurrent depressurization steps in PSA processing. For producing oxygen from air, they report findings that the addition of a simultaneous co-current depressurization step is not helpful. Their two bed cycle utilizes a backfill repressurization step, wherein the product end of the high pressure bed is connected to the product end of the low pressure bed, with passage of gas from one bed to another being continued until the lower pressure bed attains the high pressure.

Kiow and Kenny, AICHE J (1990) 36 53, have also studied a backfill step for oxygen production. Applying a mathematical model that includes rate effects as well as the equalization properties of the adsorbent, i.e. 5A zeolite, to the behavior of a super-atmospheric PSA cycle incorporating such a backfill step, with the flow rates being controlled. They found that this PSA processing cycle was beneficial for producing an enriched oxygen product. The maximum oxygen purity reported, however, was less than 80%, which is much less than the oxygen concentration required for a high purity oxygen product.

Current VPSA technology is constrained by limited economics of scale at plant sizes above 125 TPD oxygen production. Commercial VPSA systems usually employ positive displacement "Roots" type compression elements, which reach the limit of standard commercial equipment at this plant size. Machines of larger size would generally be custom designed and very expensive. The logical course would appear to be to use centrifugal compression elements. However, the efficient use of centrifugal type compressors is made difficult since VPSA processing cycles require that the compression elements operate under variable head conditions.

When large capacity plants are required, multiple systems are usually employed because of the limitations referred to above at above 125 TPD oxygen production. The use of multiple systems results, however, in nearly doubling the cost of the plant when the size is doubled. Present commercial systems are typically two or three bed systems. Such systems are single compressor designs employing similar components, and, therefore, are subject to similar economics and size limitations.

Other processing and systems for large scale oxygen production have been proposed, such as a four bed refrigerated cycle employing multiple compressors and adsorbers in large plant facilities. This cycle employs four full flow adsorbers that are quite large and have demonstrated advantage over conventional two or three bed cycles. The compression and vacuum equipment for this cycle are also sized for full flow with some indexing of the vacuum equipment as required to achieve the appropriate vacuum level. In addition, this cycle results in complex piping systems, and adsorbers and compression equipment that are large and costly. Furthermore, the pressure ratio applicable to such a refrigerated cycle does not allow for the national implementation of centrifugal equipment into the system.

It is apparent that a great many modifications and variations of the VPSA cycle, or processing sequence, have been investigated, with many such modifications or variations having been employed in commercial VPSA operations, as for the production of oxygen from air. A wide variety of possible individual steps for carrying out the pressurization and depressurization steps have been investigated. In spite of such extensive efforts, conducted over a long period of time, VPSA processes for the production of high purity oxygen remain inefficient and uneconomical, especially for large plant applications. Thus, there remains a need in the VPSA air separation field for still more efficient VPSA processing that can be scaled up for the large volume production of high purity oxygen from air.

It is an object of the invention, therefore, to provide an improved, highly efficient VPSA process and system for producing oxygen from air.

It is a further object of the invention to provide an improved PSA process and system having lower power consumption and lowered capital costs than those pertaining to conventional commercial PSA processes for the production of large volumes of high purity oxygen from air.

With these and other objects of the invention in mind, the invention is hereinafter described in detail, the novel features thereof being particularly pointed out in the appended claims.

SUMMARY OF THE INVENTION

A large VPSA oxygen plant employs four adsorption vessels, two air compressors, two vacuum pumps and one oxygen storage tank. An offset cycle is operated with continuous vacuum, employing equalization, product purge and product pressurization reflux, with two adsorbent beds on adsorption and two adsorbent beds on desorption at any time. Desirable reductions in both power and capital costs are achieved thereby.

BRIEF DESCRIPTION OF THE DRAWINGS

The invention is hereinafter described in detail with reference to the accompanying drawings in which.

DETAILED DESCRIPTION OF THE INVENTION

The objects of the invention are accomplished by employing an offset, four bed VPSA process and system, referred to herein as the 2χ2 cycle/system. The invention is directed to the use of such a 2χ2 cycle/system for a large, single train VPSA process and system capable of producing oxygen from air desirably at about 400 TPD capacity, although larger or smaller plants can also be employed in the practice of the invention. In addition to expanding the range of available equipment, the invention enables air separation efficiency to be increased, thereby improving the overall economics of the VPSA system. The invention maximizes train size through the use of multiple components adapted to operate in a cost effective manner, resulting in both lower capital costs and improved operating efficiency.

The large plant 2χ2 cycles of the invention enables such improved efficiency to be achieved, thereby advantageously resulting in lower power consumption for the overall VPSA air separation operation. This is accomplished by offsetting two cycles, each carried out using two beds, in a four bed system so that the two sets of beds are operated out of phase by one-half of a half processing cycle as described herein. The net results is that two adsorption vessels, preferably of radial flow configuration, are on adsorption and two other vessels are on desorption, at any one time, with one vessel advanced by one-half of a half cycle. The VPSA system of the invention comprises four adsorption vessels, two feed air compressors, two waste gas vacuum pumps, one valve skid operated with either two or four way valves, and one oxygen surge storage vessel. The two air compressors and vacuum pumps are alternated by means of a four way switching valve assembly during the feed and evacuation steps. The VPSA cycle of the invention results in both vacuum pumps and one feed compressor being operated at 100% utilization. The cycle also optimizes efficiency by employing the following reflux steps: (1) product oxygen purge step; (2) overlap equalization-oxygen repressurization/vacuum step; (3) overlap oxygen pressurization/feedstep; and (4) constant and raising pressure feed/vacuum steps.

The double compressor operation of the invention involves the use of combined positive displacement, i.e. "Roots", and centrifugal compressors, which is found to further improve the efficiency of the VPSA process and system. Centrifugal compressors have higher efficiencies than conventional "Roots" compressors. It should be noted that centrifugal compressors are constant head dynamic devices that should be operated with nearly constant head requirements to optimize efficiency and simplicity of operation. Centrifugal compressors, therefore, are made to evacuate or pressurize high differential pressure adsorption vessels in the practice of the invention by means of the above-mentioned switching valve system. "Roots" compressors, on the other hand, are positive displacement compressors that can be operated efficiently over a much larger pressure ratio difference. The "Roots" compressors are, conversely, used to pressurize or evacuate lower pressure ratio adsorption vessels in the practice of the invention. The VPSA cycle of the invention thus combines such operating characteristics, thereby optimizing the operating efficiency of both types of compressors.

The VPSA cycle of the invention has several advantages that thus serve to provide improving plant efficiency, as desired. These advantages include: (a) the machines can be specifically designed for operation at a smaller variation in pressure, enabling the economic use of high efficiency centrifugal compressors; (b) the use of short bed length radial flow adsorbers greatly reduces adsorbent bed pressure drops; (c) continuous compressor operation reduces frame power losses; and (d) a unique combination of steps that provide oxygen reflux, resulting in improved air separation efficiency. A combined power savings of about 20% is contemplated in the use of the 2χ2 cycle system of the invention over the power requirements of conventional VPSA technology.

It will be seen that several advantages are derived from the practice of the invention when large plant capacity is desired. These advantages derive from the fact that each adsorption vessel, feed air compressor, vacuum pump and valve need only be designed for one half of the process requirements of the large scale VPSA operation. The main components that limit plant scale-up in conventional VPSA systems, but that are overcome in the practice of the invention, are vacuum pump limitations, feed blower size limitations, adsorption vessel size limitations, and process valve size limitations.

The 2χ2 cycle/system of the invention, which enables efficient use of centrifugal compression elements to be achieved, employs, as indicated above, (two) two-bed cycles offset from one another by one half of one-half of a processing cycle. This means that two adsorption vessels are simultaneously under either feed or vacuum conditions from two different machines. The benefits thereof are two fold. First, the sizing of the compression element can be set at approximately one-half of the total flow, considerably reducing the size of each individual machine. Second, the process conditions can be more closely controlled to achieve a reduced variable head (pressure) requirement for the centrifugal compressor.

One of the two feed air compressors used in the practice of the invention will thus be a variable, low pressure ratio "Roots" type machine that will operate efficiently in the low pressure level range, while the other will be a relatively constant, higher pressure ratio centrifugal compressor having inherently higher efficiencies under higher pressure ratio conditions.

Vessel design limitations are overcome in the practice of the invention by the use of the 2χ2 offset cycle/system with four adsorption vessels, two of which are offset in time. This enables the vessels to be adapted for one-half of the total feed air or waste gas flow. In the preferred embodiments of the invention, larger capacity radial flow adsorption vessels are employed. The processing cycle of the invention is suited for the incorporation of radial flow adsorption vessels having reduced bed lengths and relatively high feed air velocities. This results in the ability to employ relatively small adsorption vessels with minimal adsorbent inventories employed for the desired VPSA-oxygen production operations.

Another feature of the invention relates to process valve size and cost limitations associated with large size VPSA-oxygen operations. It should be noted that the large process valve size requirements of a large size VPSA plant are reduced by half by the use of the 2χ2 offset cycle/system of the invention. Thus, the valve sizes needed for the invention are one-half as large as those of conventional full flow VPSA cycles.

The number of valves required for the VPSA-oxygen operation are also reduced in the practice of particular embodiments of the invention. The use of four way valves in combination with two way valves serves to eliminate one-half of the blower switching valves required. Thus, eight two way valves can be replaced by two four way valves in the practice of embodiments falling within the scope of the invention.

The result of such improvements in the practice of the invention is an appreciable reduction in capital costs at the 400 TPD size VPSA-oxygen plant level, as compared to the conventional use of multiple VPSA plants. The overall reduction in capital costs achievable in the practice of the invention is estimated at from 10% to 20%.

The offset 2χ2 cycle/system of the invention enables a 400 TPD oxygen VPSA plant to be operated as a single train. The smaller sized beds, particularly radial beds, and the centrifugal compressors employed, improve the efficiency of the VPSA-air separation process. The large four way switching valves employed simplify the piping requirements of the system, contributing to the cost reduction and improved performance obtained in the practice of the invention.

The large plant 2χ2 cycle system of the invention includes the following features employed in various embodiments of the invention:

(1) Offsetting the two adsorption vessels on adsorption and the two adsorption vessels of the four adsorption vessel system or desorption at any time, thereby (a) reducing the necessary vessel diameter, (b) reducing the valve sizes required and (c) reducing the air compressor size required;

(2) Optimizing the combination of Roots and centrifugal compression for increased efficiency;

(3) Use of combination offset cycle with product pressurization, resulting in reduced head variation for the centrifugal compressors, allowing for higher system operating efficiency;

(4) Use of an oxygen purge step at constant lower, subatmospheric desorption pressure, reducing the pressure variation for the centrifugal compressor, and reducing the required pressure ratio for the centrifugal compressor, thereby reducing the average head requirement for the waste stream and lowering the power consumption of the system;

(5) Overlap evacuation/oxygen pressure equalization, providing continuous vacuum pump utilization;

(6) Overlap feed/oxygen pressure equalization, providing for increased utilization of Roots-type feed blower;

(7) Offset cycle, allowing for the production of oxygen product during product pressurization, thereby reducing the size of the oxygen surge tank employed;

(8) The use of oxygen surge tank to allow for a nearly constant pressure oxygen product production step;

(9) Use of a product pressurization step to simultaneously introduce gas to an adsorbent bed from both ends of an adsorption vessel, allowing for the operation of higher feed air velocity with minimum likelihood of undesired fluidization;

(10) Use of a radial bed in preferred embodiments, with the feed end of the bed at the outer circumference of the bed, and the product end at the inner portion thereof, with asymmetric flow area as a function of cross sectional bed area to improve, i.e. decrease, pressure drop losses and resistance to mass transfer;

(11) Use of four way valve system in combination with two way valves, thereby eliminating half of the switching valves, i.e. eight 2-way valves are eliminated by the use of two 4-way valves; and (12) Use of two air compressors, allowing for continuous operation of the high pressure feed air compressor, preferably a centrifugal compressor, during the equalization portion of the overall cycle.

Figure 1A:
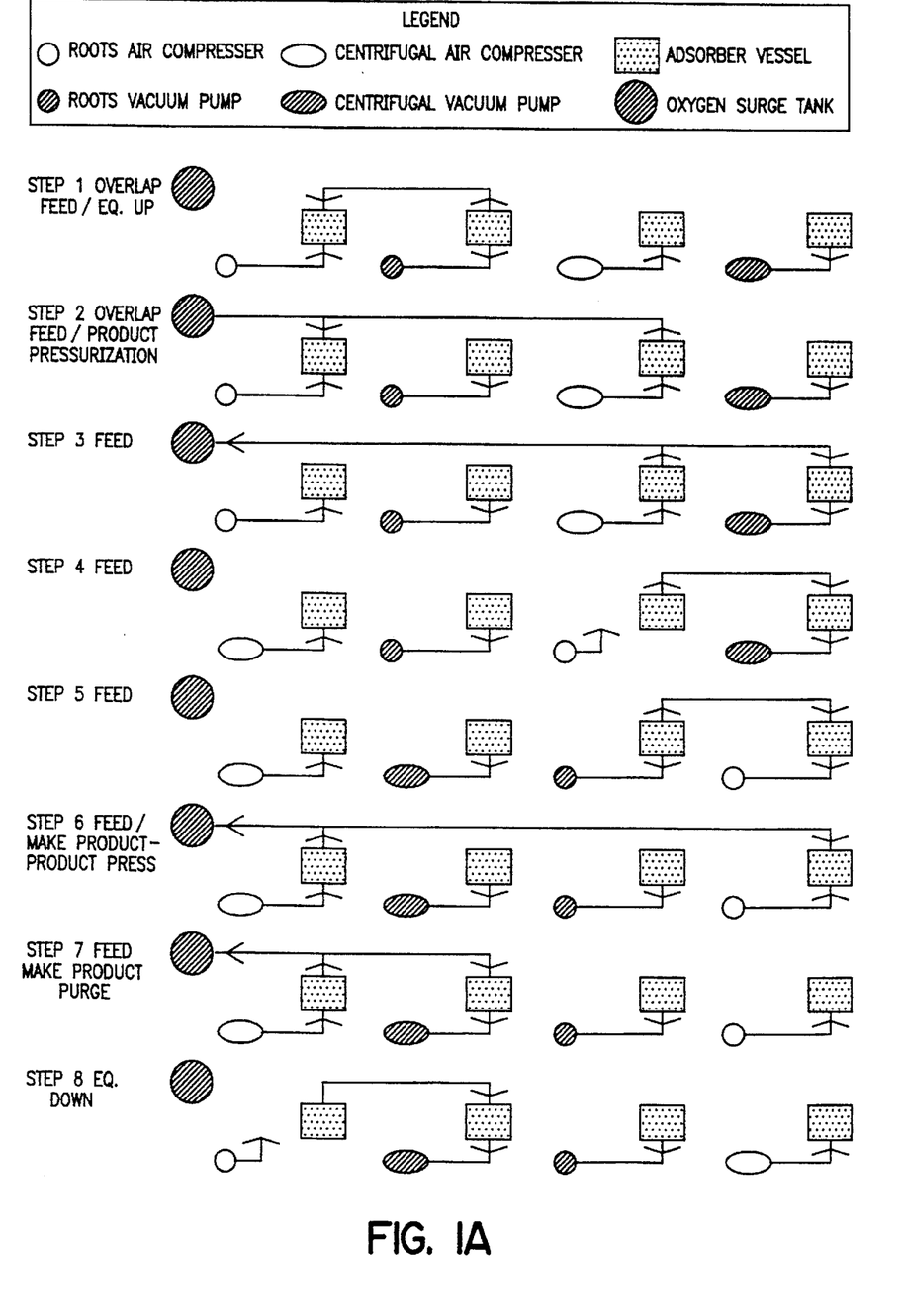
FIG. 1 is a schematic step diagram for the offset processing cycle of the invention as carried out in four bed VPSA system.
Figure 1B:
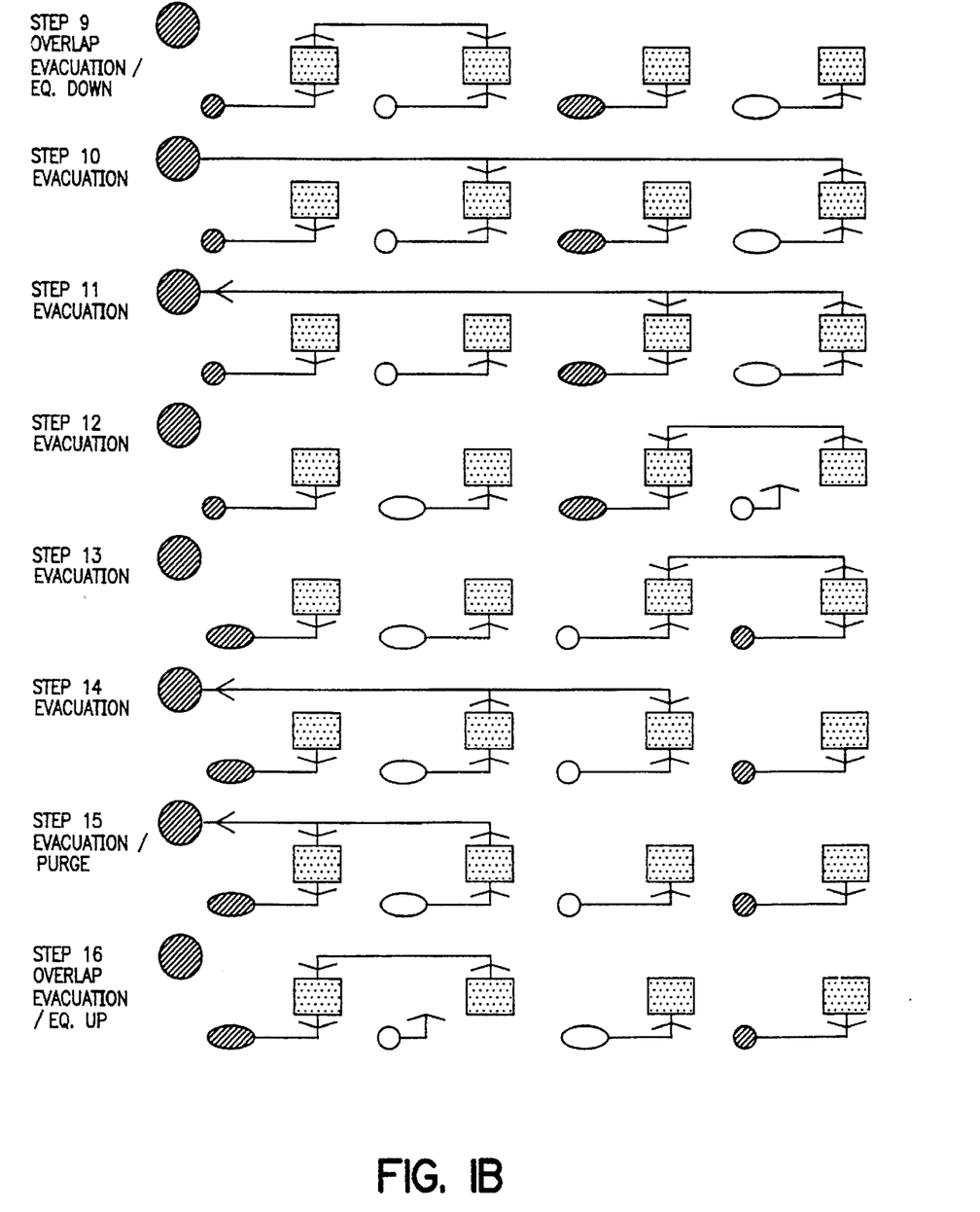

The offset 2χ2 cycle/system of the invention is illustrated in FIG. 1 of the drawings. The summary of the step times for the cycle process are, for a particular embodiment, as shown in the Table below.

TABLE

2 × 2 OFFSET CYCLE

| Step Description | Step time, sec | Start Pressure, psia | End Pressure, psia |
| --- | --- | --- | --- |
| Step #1 Raising pressure feed with overlap equalization | 2 | 6 | 13 |
| Step #2 Raising pressure feed with overlap product pressurization | 5 | 13 | 18 |
| Step #3 Raising pressure feed | 3 | 18 | 20 |
| Step #4 Raising pressure feed | 2 | 20 | 21 |
| Step #5 Raising pressure feed | 2 | 21 | 22 |
| Step #6 Constant pressure feed make product and oxygen purge reflux | 5 | 22 | 22 |
| Step #7 Constant pressure feed make product and repressurization reflux | 3 | 22 | 22 |
| Step #8 Falling pressure equalization | 2 | 22 | 19 |
| Step #9 Falling pressure evacuation with overlap equalization | 2 | 19 | 15 |
| Step #10–12 Falling pressure evacuation | 10 | 15 | 6 |
| Step #13–14 Falling pressure evacuation | 7 | 6 | 4 |
| Step #15 Constant pressure evacuation with Oxygen purge | 3 | 4 | 4 |
| Step #16 Raising pressure evacuation with overlap equalization | 2 | 4 | 6 |

The process steps of the offset 2χ2 cycle/system are described below with respect to the processing sequence of bed A as shown in FIG. 1.

Step #1—Overlap feed adsorption/oxygen equalization pressurization:

This step starts the feed air pressurization-adsorption period. Air is fed to the bottom of the adsorber from the Roots type compressor. The pressure rises rapidly in this step from 6 psia to 13 psia, with the step being 2 seconds in duration. Oxygen equalization gas is also simultaneously introduced into the top of the adsorber during this step. The oxygen equalization gas is taken from bed B which continues to depressurize.

Step #2—Overlap feed adsorption/product oxygen pressurization:

This step continues the feed air pressurization adsorption period. Air is fed to the bottom of the adsorber from the Roots type compressor. The pressure continues to rise during this step from 13 psia to 18 psia, with the step being 5 seconds in duration. Oxygen repressurization gas is also simultaneously introduced into the top of the adsorber during this step. The oxygen reflux gas is taken from bed C, which is in the make product step, interconnecting the offset two bed pairs with each other during this step. This feature eliminates an oxygen reflux requirement from the oxygen surge tank.

Step #3—Rising pressure feed adsorption:

Feed air is introduced in the adsorber, and no oxygen gas is added or removed from the top. The pressure rises from 18–20 psia during this three second step. The feed air is supplied by the Roots compressor during this step. The pressure variation, without the addition of oxygen reflux, is slower in this step as compared to the earlier steps. The cycle could be operated without an oxygen surge tank by producing oxygen at this lower pressure. The efficiency of the cycle would be slightly reduced with a longer product make cycle.

Step #4–5—Rising pressure feed adsorption:

Feed air introduction continues into the adsorber, and no oxygen gas is added or removed from the top. The pressure rises from 20 to 22 psia during this four second period to the maximum adsorption pressure. The feed air is supplied by the centrifugal compressor during these steps. The pressure ratio variation is much smaller in this period as compared to the total pressurization pressure. This small pressure variation allows for the use of a centrifugal compressor.

The purpose is to achieve the maximum adsorption pressure before producing product. The constant pressure product gas recovery improves oxygen recovery from the system. The cycle could be operated without an oxygen surge tank by producing oxygen at this lower pressure. The efficiency of the cycle would be slightly reduced with a longer product make cycle.

Step #6–7—Constant pressure feed and make product and reflux:

Feed air is introduced into the bottom of the adsorber, while oxygen product is removed from the top. The pressure remains relatively constant during this eight second period at 22 psia. The feed air is supplied from the centrifugal compressor with little change in pressure ratio. The oxygen product is supplied to the oxygen surge tank as well as to adsorber D as oxygen repressurization reflux, and later to adsorber B as oxygen purge. The purity of the oxygen product remains relatively constant during the product make steps. The oxygen repressurization step #2 introduces high purity oxygen into the top of the adsorber prior to the oxygen make step, eliminating any oxygen purity spike at the beginning of the step. The product make step is terminated prior to the oxygen front actually breaking through at the top of the bed.

Step #8—Falling pressure equalization.

The residual pressure and oxygen product at the top of the bed is withdrawn during this step from the top of the vessel. No flow is removed from the bottom of the adsorber. The vessel pressure is lowered from 22 to 19 psia during this two second step. The oxygen concentration starts as product purity (90%) and falls to about 70% oxygen at the end of the step as the front breaks through at the top. The Roots feed air compressor is vented during this step.

Step #9—Falling pressure evacuation and overlap equalization.

Waste nitrogen is removed from the bottom of the adsorber through the Roots type vacuum pump. The pressure falls from 19 psia to 15 psia during this two second step. The oxygen concentration starts at about air purity and falls rapidly to the minimum waste purity of 5–10%. The equalization, pressure-falling flow of oxygen gas continues to be removed from the top of the adsorber.

Step #10–12—Falling pressure evacuation:

Waste nitrogen is removed from the bottom of the adsorber through the Roots type vacuum pump. The pressure falls from 15 psia to 6 psia during this ten second period. No gas flow exists at the top to the adsorber.

Step #13–14—Falling pressure evacuation:

This period is a continuation of the evacuation process, with the vacuum pump now switching to the centrifugal machine. The pressure has fallen sufficiently to utilize the centrifugal vacuum pump efficiently. Waste nitrogen is removed from the bottom of the adsorber, and the pressure falls from 6 psia to 4 psia during this seven second period. No gas flow exists at the top of the adsorber.

Step #15—Constant pressure evacuation and oxygen purge:

The minimum evacuation pressure has been reached and oxygen purge is introduced to the top of the adsorber. The pressure remains constant during this three second step at 4 psia, due to the matching of the purge flow to the evacuation flow. The waste purity remains relatively constant during this period.

Step #16—Rising pressure evacuation and rising pressure equalization:

The centrifugal vacuum pump continues to remove waste gas from the bottom of the adsorber, while oxygen equalization is added to the top of the adsorber. The pressure rises during this step as a result of the oxygen equalization flow, which is larger than the evacuation flow at this deep vacuum. The pressure rises from 4 to 6 psia during the two second step. The oxygen concentration of the waste stream begins to elevate slightly at the end of this step as the oxygen front begins to break through at the bottom.

An embodiment of the VPSA system of the invention adapted for the practice of the processing sequence described above includes the use of four-way valves, radial beds, centrifugal compressors and combination twin compressors and vacuum pumps.

Figure 2:
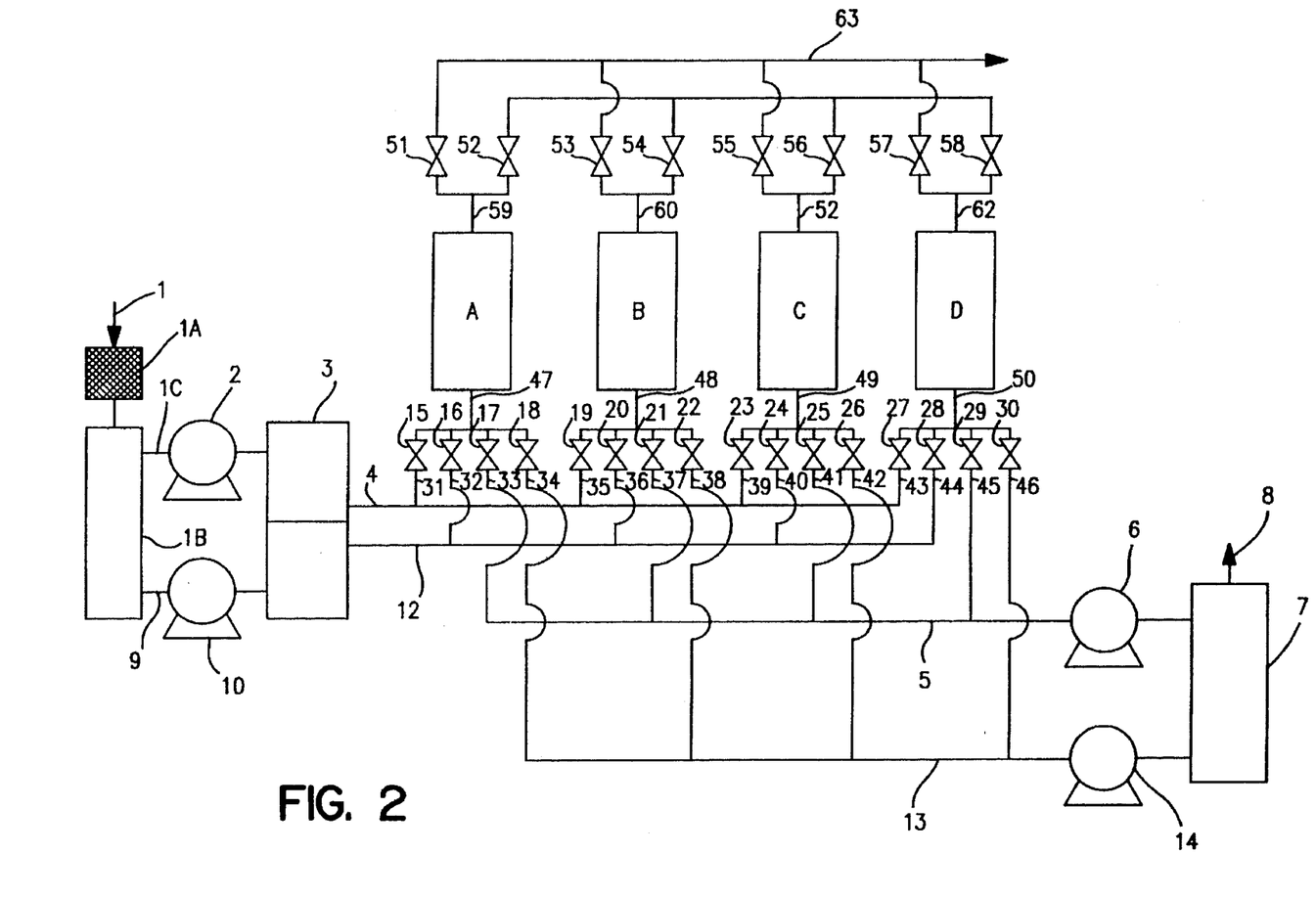
FIG. 2 is a schematic flow diagram of an embodiment of the VPSA process and system of the invention, said system employing 2-way valves therein.
Figure 3:
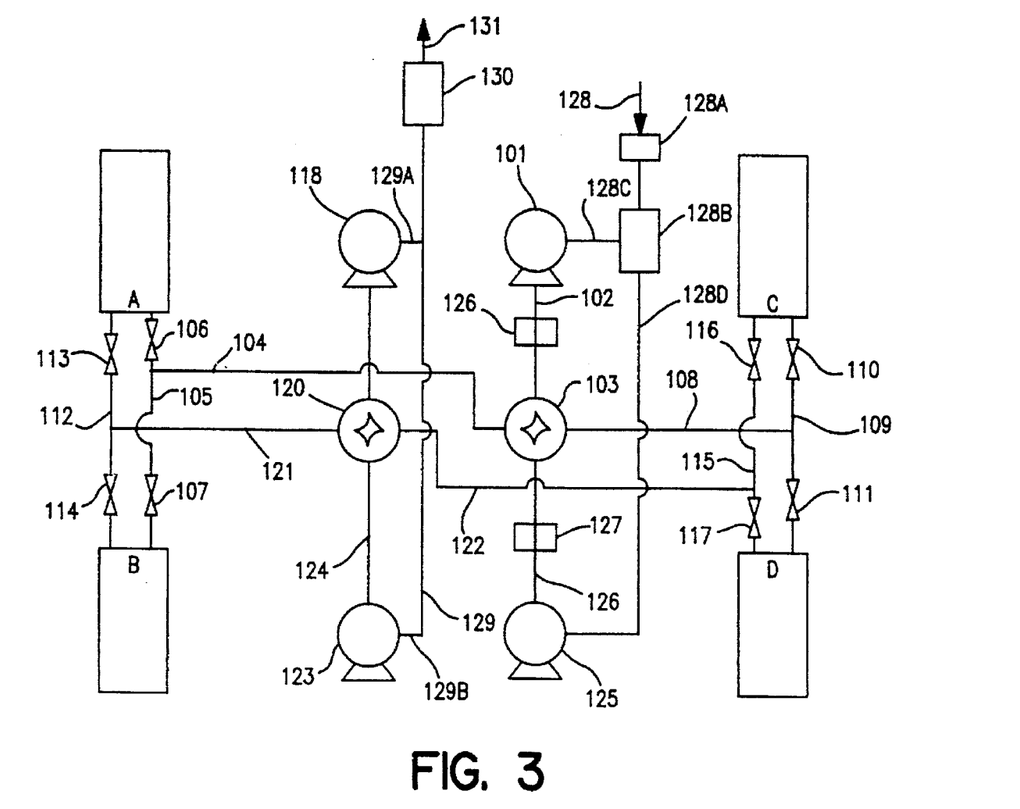
FIG. 3 is a schematic flow diagram of an embodiment of the VPSA process and system of the invention, said system employing 4-way valves therein.

The system or process flow diagrams of FIGS. 2 and 3 illustrate the practice of the invention using two-way valves and four-way switching valves, respectively. In the FIG. 2 embodiment, feed air is passed in line 1 to filter (inlet) 1A, silencer (inlet) 1B, and pipe 1C to a Roots compressor 2 and into feed discharge silencer 3 from which it is passed through line 4 for passage to the bottom or feed end of beds A, B, C and D, from which gas is also discharged for passage from one bed to another or to manifold 5 for passage to Roots type vacuum pump 6 and discharge from the system through vacuum discharge silencer 7 and exit line 8. Feed air can also pass through line 9 to centrifugal air compressor 10 for passage through line 12 to the bottom or feed end of beds A, B, C and D, from which gas is also discharged for passage from one bed to another or to manifold 13 for passage to centrifugal vacuum pump 14 and discharge through surge vessel 7, and discharged from the system through said exit line 8. Sixteen 2-way valves, i.e. valves 15–30 are in fluid communication with said lines 4 and 12 and with said manifolds 5 and 13 through lines 31–46 as shown. Each group of four valves is in fluid communication with the bottom of one of the adsorbent beds, that is, valves 15–18 are in fluid communication with the bottom of bed A through line 47, valves 19–22 are in fluid communication with the bottom of bed B through line 48, valves 23–26 are in fluid communication with the bottom of bed C through line 49, and valves 27–30 are in fluid communication with the bottom of bed D through valve 50.

At the top or discharge end of the beds, valve sets 51–52, 53–54, 55–56 and 57–58 are provided with fluid communication from each bed being provided by the indicated lines, i.e. line 59 from bed A, line 60 from bed B, line 61 from bed C and line 62 from bed D. Gas passing through valves 51, 53, 55 and 57 pass to oxygen product line 63 for recovery from the system.

In the FIG. 3 embodiment, feed air from Roots compressor 101 is passed in line 102 containing discharge silencer 126 to four-way switching valve 103 for passage (1) in line 104 to line 105 for passage through valve 106 to bed A or through valve 107 to bed B, or (2) in line 108 to line 109 for passage through valve 110 to bed C or through valve 111 for passage to bed D.

Gas can be passed between beds A and B through line 112, having valves 113 and 114 therein, and between beds C and D through line 115, having valves 116 and 117 herein. Vacuum Roots pump 118 can be used, through line 119 and four-way switching valve 120, to draw gas from either bed A or bed B through line 121 and line 112, or from bed C or bed D through line 112 and line 115. Likewise, vacuum centrifugal pump 123 can be used to draw gas from said beds by means of line 124 in fluid communication with switching valve 120, and vacuum centrifugal pump 125 can likewise be used to draw gas through line 126 containing discharge silencer 127. As will be seen in said FIG. 3, incoming line 128 passes to filter 128A, silencer 128B and pipe 128C to Roots compressor 101, and line 128D to vacuum centrifugal pump 125. Similarly line 129 and pipe 129A from vacuum Roots pump 118 and pipe 129B from vacuum centrifugal pump 123, pass to vacuum discharge silencer 130 and discharge line 131.

The use of four-way switching valves in the FIG. 3 embodiment greatly simplifies the piping and valve requirements by eliminating eight two-way valves through the use of two four-way valves. The four-way valves alternate the high and low pressure compressor switching, as indicated above, eliminating specific manifolds for each machine.

Radial beds in which feed gas flow is to the outside circumference of an adsorbent bed, with passage therethrough having a decreasing cross-sectional area in the direction of radial flow towards the product end at the center of the bed, are inherently capable of accommodating large gas flows. Such radial beds have relatively short bed lengths as compared to conventional cylindrical beds in which feed gas flow is typically to the bottom of a vertically positioned bed, with product gas being recovered from the top of the bed. While not an essential feature of the invention, radial beds can be used to advantage in the practice of the invention. Low pressure drops and low bed size requirements can be achieved through the use of radial beds, lowering both capital cost and the power requirements of PSA operations carried out therein.

As indicated above, the employment of centrifugal compressors in conventional VPSA cycles is quite difficult. The offset 2χ2 cycle/system of the invention enables centrifugal compression units to be efficiently employed for VPSA-oxygen product operations. The invention, as described and claimed herein, employs (two) two-bed cycles offset from one another by one half of one half of a processing cycle. This results in two vessels simultaneously under feed or vacuum from two different machines. The sizing of the compression elements is set at approximately one-half of the total flow, and the process conditions are closely controlled to achieve a much reduced variable head requirement for the centrifugal compressor.

The cycle employed in the preferred embodiments of the invention will employ two feed air compressors and two vacuum pumps. One compressor will be a low pressure ratio "Roots" type machine, and the second a higher ratio centrifugal compressor. The "Roots" machine will efficiently operate in the low pressure ratio range, and the centrifugal compressors with inherently higher efficiencies will be used at the higher pressure ratio conditions.

It will be understood that various changes and modifications can be made in the details of the invention without departing from the scope of the invention as recited in the claims.

We claim:

1. In a vacuum pressure swing adsorption process adapted for the recovery of oxygen from feed air in a system having adsorption vessels each containing a bed of adsorbent material capable of selectively adsorbing nitrogen from feed air at an upper adsorption pressure and desorbing said nitrogen at a lower subatmospheric desorption pressure, each adsorption vessel having a feed end for the introduction of feed air thereto and a product end for the recovery of oxygen product therefrom, each bed undergoing a processing cycle including the following steps, on a cyclic basis, (1) repressurization from an intermediate pressure to said upper adsorption pressure; (2) adsorption at said upper adsorption pressure, with the passage of feed air to the feed end of the bed, and recovery of oxygen from the product end thereof; (3) cocurrent depressurization, with release of gas from the product end of the bed, and the passage thereof to the product end of another bed in the system initially at its said lower subatmospheric desorption pressure for approximate pressure equalization therebetween at said intermediate pressure; (4) countercurrent depressurization to a lower intermediate pressure, with discharge of gas from the feed end of the bed; (5) further countercurrent depressurization to said lower subatmospheric desorption pressure, with discharge of gas from the feed end of the bed; and (6) partial repressurization from said lower, subatmospheric desorption pressure to said intermediate pressure, with passage of oxygen to the product end thereof from the product end of another bed in the system undergoing depressurization from the upper adsorption pressure for approximate pressure equalization at said intermediate pressure, the improvement comprising introducing feed air, on said cyclic basis, to four of said adsorption vessels adapted for operation as (two) two-bed processing systems, the processing cycle of one two-bed system being offset from the other two-bed system by one half of one half of a processing cycle, with one adsorption vessel from each two-bed processing system undergoing adsorption step (2), and one adsorption vessel from each two-bed processing system under depressurization step (5), simultaneously with each other, whereby the efficiency of the vacuum pressure swing adsorption process is enhanced, and the power requirements thereof are reduced.

2. The process of claim 1 in which two feed air compressors are employed for carrying out steps (1) and (2) in said (two) two-bed processing systems, and two vacuum pumps are employed for carrying out step (5) in said processing systems.

3. The process of claim 2 in which said feed air compressors and said vacuum pumps are positive displacement machines.

4. The process of claim 2 in which one feed air compressor and one vacuum pump is a positive displacement machine, and one feed air compressor and one vacuum pump is a centrifugal machine, with feed air passing through said positive displacement pump during the major portion of repressurization step (1), and said feed air passing through said centrifugal vacuum pump during the remaining portion of said step (1) and during adsorption step (2), with countercurrent depressurization step (4) and an initial portion of further countercurrent depressurization step (5) being carried out through the positive displacement pump, and the final portion of said step (5) being carried out through the centrifugal vacuum pump.

5. The process of claim 4 and including the passing of oxygen to the product end of each bed as purge gas following step (5) and before step (6) in said bed.

6. The process of claim 4 and including, during a portion of said repressurization step (1), the passing of oxygen to the product end of the bed simultaneously with the passage of feed air to the feed end of the bed.

7. The process of claim 6 in which said oxygen passed to the product end of the bed is oxygen withdrawn from an oxygen surge tank.

8. The process of claim 7 and including passing additional quantities of oxygen to the product end of the bed from the product end of the other bed in the two-bed system during an initial portion of said repressurization step (1).

9. In a vacuum pressure swing adsorption system adapted for the recovery of oxygen from feed air in said system having adsorption vessels each containing a bed of adsorbent material capable of selectively adsorbing nitrogen from feed air at an upper adsorption pressure and desorbing said nitrogen at a lower, subatmospheric desorption pressure, each adsorption vessel having a feed end for the introduction of feed air thereto and a product end for the recovery of oxygen product therefrom, each bed undergoing a processing cycle including the following steps, on a cyclic basis, (1) repressurization from an intermediate pressure to said upper adsorption pressure; (2) adsorption at said upper adsorption pressure, with the passage of feed air to the feed end of the bed, and the recovery of oxygen from the product end thereof; (3) cocurrent depressurization with release of gas from the product end of the bed, and the passage thereof to the product end of another bed in the system initially at its said lower subatmospheric desorption pressure for approximate pressure equalization therebetween at said intermediate pressure; (4) countercurrent depressurization to a lower intermediate pressure, with discharge of gas from the feed end of the bed; (5) further countercurrent depressurization to said lower subatmospheric desorption pressure, with discharge of gas from the feed end of the bed; and (6) partial repressurization from said lower, subatmospheric desorption pressure to said intermediate pressure, with passage of oxygen to the product end thereof from the product end of another bed in the system undergoing depressurization from the upper adsorption pressure for approximate pressure equalization at said intermediate pressure, the improvement comprising employing four of said adsorption vessels adapted for operation as (two) two-bed processing systems, with one two-bed system being adapted for operation offset from the other two-bed system by one half of one half of a processing cycle, so that one adsorption vessel from each two-bed processing system will undergo adsorption step (2), and one adsorption vessel from each two-bed processing system will undergo depressurization step (5), simultaneously with each other, whereby the efficiency of the vacuum pressure swing adsorption system is enhanced, and the power requirements of said system are reduced.

10. The system of claim 9 in which two feed air compressors are incorporated for carrying out steps (1) and (2) in said (two) two-bed processing systems, and two vacuum pumps are employed for carrying out step (5) therein.

11. The system of claim 10 in which said feed air compressors and said vacuum pumps are positive displacement machines.

12. The system of claim 10 in which one feed air compressor and one vacuum pump is a positive displacement machine, and one feed air compressor and one vacuum pump is a centrifugal machine, with the positive displacement pump being adapted for operation during the major portion of repressurization step (1), and the centrifugal vacuum pump being adapted for operation during the remaining portion of step (1) and during adsorption step (2), and with the positive displacement pump being operated during countercurrent depressurization step (4) and an initial portion of further countercurrent depressurization step (5), and the centrifugal vacuum pump being operated during the final portion of said step (5).

13. The system of claim 12 and including conduit means for the passage of oxygen to the product end of each bed as purge gas following step (5) and before step (6) in said bed.

14. The system of claim 12 and including conduit means for passing oxygen to the product end of the bed, during a portion of said repressurization step (1), simultaneously with the passage of feed air to the feed end of the bed.

15. The system of claim 14 and including conduit means for the passage of oxygen to the product end of the bed from an oxygen surge tank.

16. The system of claim 9 in which each bed of adsorbent material is a radial bed having an asymmetric flow area, with the feed end at the outer circumference of the bed and the product end at the inner portion thereof.

17. The system of claim 9 and including a control system for the passage of gas to and from each bed of adsorbent material comprising sixteen two-way valves.

18. The system of claim 9 and including a control system for the passage of gas to and from each bed of adsorbent material comprising two four-way valves and eight two-way valves.

19. The system of claim 9 and including an oxygen surge tank adapted to receive oxygen product gas from the product end of each adsorption vessel and to pass oxygen to said product end of each adsorption vessel.

* * * * *